(12) United States Patent
Takahashi

(10) Patent No.: US 9,514,337 B2
(45) Date of Patent: Dec. 6, 2016

(54) CARD READER AND DETECTION MECHANISM

(71) Applicant: NIDEC SANKYO CORPORATION, Suwa-gun, Nagano (JP)

(72) Inventor: Hideyuki Takahashi, Nagano (JP)

(73) Assignee: NIDEC SANKYO CORPORATION, Nagano (JP)

(*) Notice: Subject to any disclaimer, the term of this patent is extended or adjusted under 35 U.S.C. 154(b) by 0 days.

(21) Appl. No.: 14/894,835

(22) PCT Filed: Apr. 7, 2014

(86) PCT No.: PCT/JP2014/060071
§ 371 (c)(1),
(2) Date: Nov. 30, 2015

(87) PCT Pub. No.: WO2014/192420
PCT Pub. Date: Dec. 4, 2014

(65) Prior Publication Data
US 2016/0140365 A1    May 19, 2016

(30) Foreign Application Priority Data
May 28, 2013  (JP) ................................ 2013-111725

(51) Int. Cl.
*G06K 7/06*  (2006.01)
*G06K 7/01*  (2006.01)
(Continued)

(52) U.S. Cl.
CPC .............. *G06K 7/01* (2013.01); *G06K 7/0056* (2013.01); *G06K 7/087* (2013.01); *H01H 2231/006* (2013.01); *H01H 2239/032* (2013.01)

(58) Field of Classification Search
USPC .......................... 235/443, 453, 444
See application file for complete search history.

(56) References Cited

U.S. PATENT DOCUMENTS 7,721,970 B2 * 5/2010 Liang .................. G06F 1/187
235/479
8,302,857 B2 * 11/2012 Tatai ..................... G07F 9/02
235/380
(Continued)

FOREIGN PATENT DOCUMENTS

JP    H1156759 A    3/1999
JP    H11180222 A   7/1999
(Continued)

OTHER PUBLICATIONS

International Search Report corresponding to Application No. PCT/JP2014/060071; Date of Mailing: Jun. 17, 2014, with English translation.

*Primary Examiner* — Ahshik Kim
(74) *Attorney, Agent, or Firm* — Cantor Colburn LLP

(57) ABSTRACT

A card reader which is attached and used in a host device may include a detection switch disposed on the card reader side attaching face and structured to detect whether the card reader has been detached from the host device; and a first sealing member disposed so as to be sandwiched between the host device side attaching face and the detection switch, the first sealing member covering the detection switch and being structured to prevent penetration of water to the detection switch. The detection switch may include a pressed part and is structured to turn to "ON" or "OFF" when the pressed part is pressed. The first sealing member may be formed with a pressing protruded part structured to press the pressed part.

22 Claims, 6 Drawing Sheets

(51) Int. Cl.
*G06K 7/00* (2006.01)
*G06K 7/08* (2006.01)

(56) References Cited

U.S. PATENT DOCUMENTS

| | | | | |
|---|---|---|---|---|
| 2007/0080225 A1* | 4/2007 | Hirasawa | ................ | G06K 7/08 235/449 |
| 2009/0152354 A1* | 6/2009 | Taylor | ................ | G06K 13/0875 235/439 |
| 2012/0193417 A1* | 8/2012 | Watanabe | .............. | G06K 7/084 235/449 |

FOREIGN PATENT DOCUMENTS

| | | | |
|---|---|---|---|
| JP | 2001148979 | A | 6/2001 |
| JP | 2009037364 | A | 2/2009 |
| JP | 2010102980 | A | 5/2010 |
| JP | 2013020870 | A | 1/2013 |

\* cited by examiner

Fig. 7(A)
Fig. 7(B)
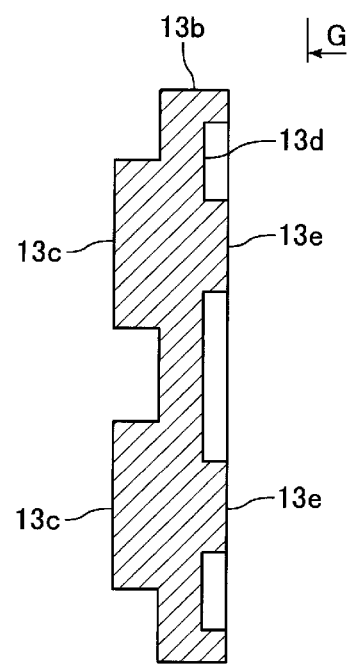
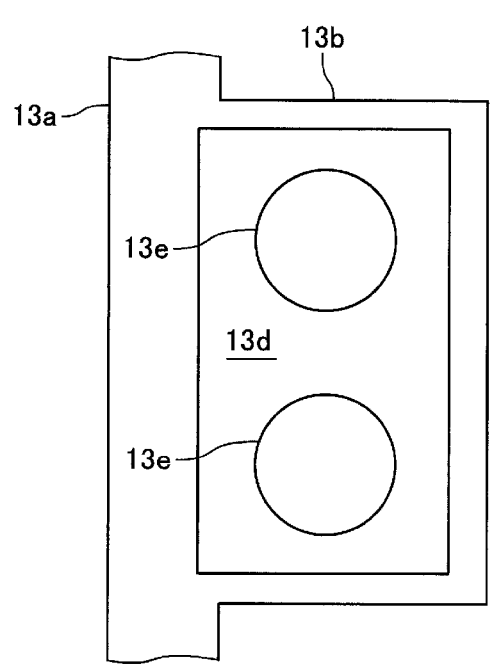
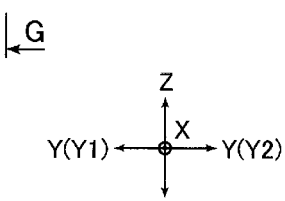
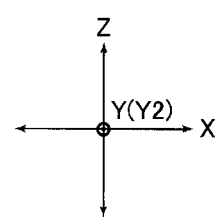

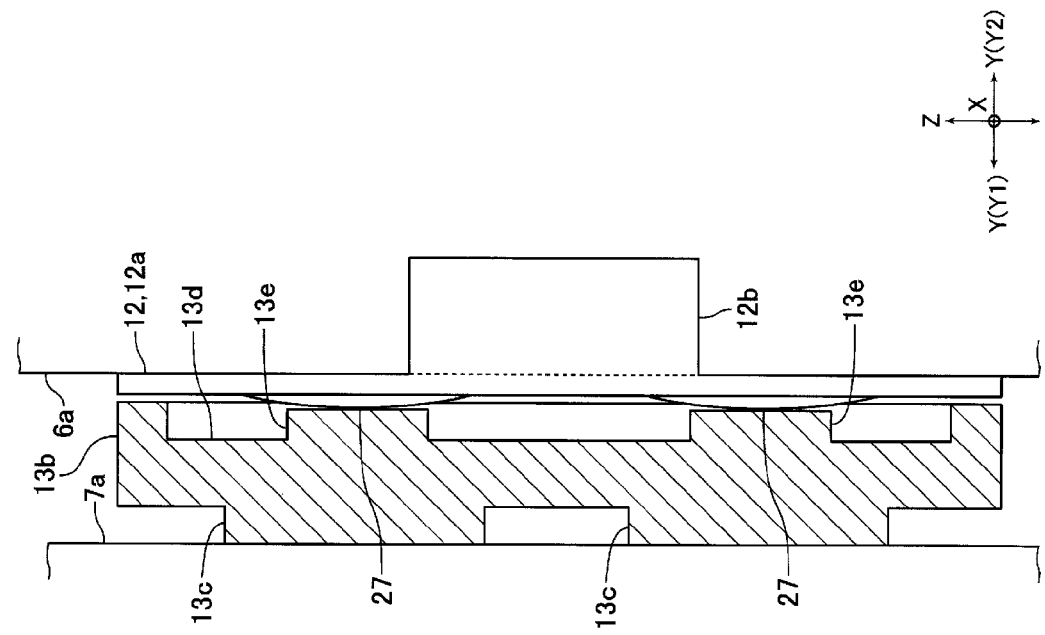
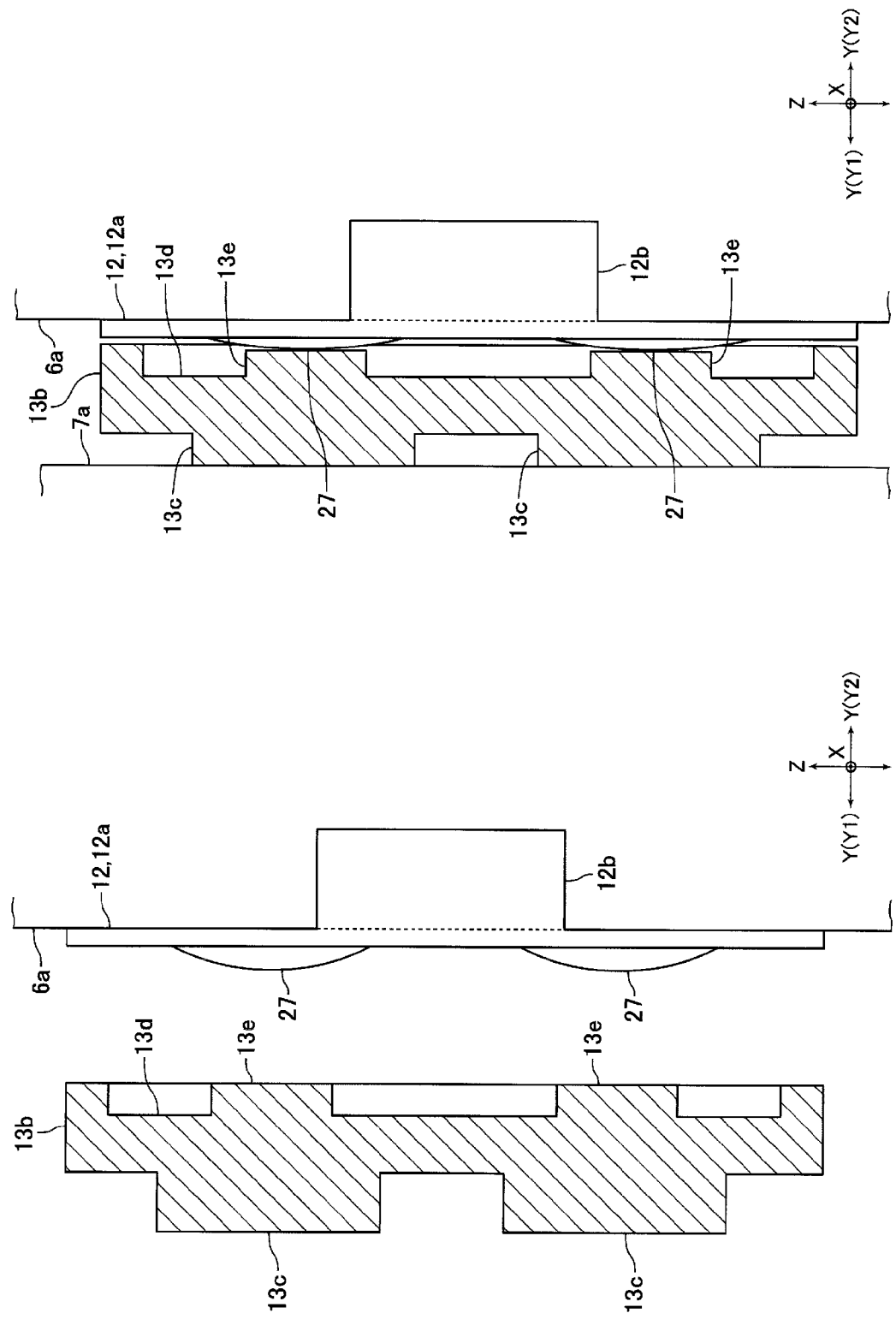

CARD READER AND DETECTION MECHANISM

CROSS REFERENCE TO RELATED APPLICATIONS

This is the U.S. national stage of application No. PCT/JP2014/060071 filed on Apr. 7, 2014. Priority under 35 U.S.C. §119(a) and 35 U.S.C. §365(B) is claimed from Japanese Applications No. 2013-111725, filed May 28, 2013; the disclosures of which are incorporated herein by reference.

FIELD OF THE INVENTION

At least an embodiment of the present invention relates to a card reader which is attached and used in a host device. Further, at least an embodiment of the present invention relates to a detection mechanism for detecting detachment of an attached body from an attaching body to which the attached body is attached.

BACKGROUND

Conventionally, a card reader has been known which is attached and used in a host device such as an ATM (Automated Teller Machine) (see, for example, Patent Literature 1). In the card reader described in Patent Literature 1, an attaching recessed part is formed on a back face of a main body frame of a card processing part where reproduction of information recorded in a card and recording of information to the card are performed. A bottom face of the attaching recessed part is an attaching reference face for attaching the card reader to the host device. Further, a detection mechanism for detecting that the card reader has been detached from the host device is disposed in the attaching recessed part. The detection mechanism includes a sheet switch.

In a case that the card reader described in Patent Literature 1 has been attached to the host device, the sheet switch is pushed by a tip end face of an abutting protruded part formed in the host device and the sheet switch is set in an "ON" state. On the other hand, when the card reader is detached from the host device, the sheet switch is separated from the tip end face of the abutting protruded part and thus the sheet switch is turned to an "OFF" state. Therefore, in the card reader described in Patent Literature 1, the sheet switch is switched from an "ON" state to an "OFF" state and thereby it is detected that the card reader has been detached from the host device.

PATENT LITERATURE

[PTL 1] Japanese Patent Laid-Open No. 2010-102980

The host device to which the card reader described in Patent Literature 1 is attached is formed with an abutting protruded part for pushing the sheet switch. In other words, the host device is required to provide with the abutting protruded part for pushing the sheet switch. Therefore, the structure of the host device is complicated.

SUMMARY

In view of the problem described above, at least an embodiment of the present invention provides a card reader which is capable of surely pressing a pressed part of a detection switch for detecting detachment of the card reader from a host device when the card reader has been attached to the host device even in a case that the structure of the host device to which the card reader is attached is simplified. Further, at least an embodiment of the present invention provides a detection mechanism which is capable of surely pressing a pressed part of a detection switch for detecting detachment of an attached body from an attaching body when the attached body has been attached to the attaching body even in a case that the structure of the attaching body to which the attached body is attached is simplified.

To achieve the above, at least an embodiment of the present invention provides a card reader which is attached and used in a host device. When an attaching face of the card reader side for attaching the card reader to the host device is referred to as a card reader side attaching face, and an attaching face of the host device side for attaching the card reader to the host device is referred to as a host device side attaching face, the card reader includes a detection switch which is disposed on the card reader side attaching face for detecting that the card reader has been detached from the host device, and a first sealing member which is disposed so as to be sandwiched between the host device side attaching face and the detection switch and covers the detection switch for preventing penetration of water to the detection switch. The detection switch includes a pressed part and is turned to "ON" or "OFF" when the pressed part is pressed, and the first sealing member is formed with a pressing protruded part for pushing the pressed part.

In the card reader in accordance with at least an embodiment of the present invention, the first sealing member disposed so as to be sandwiched between the host device side attaching face and the detection switch is formed with a pressing protruded part for pushing the pressed part. Therefore, according to at least an embodiment of the present invention, even in a case that the host device side attaching face is formed in a flat face shape, the pressed part of the detection switch can be surely pressed by using the pressing protruded part of the first sealing member when the card reader is attached to the host device. In other words, according to at least an embodiment of the present invention, even in a case that an abutting protruded part described in Patent Literature 1 is not formed in the host device, the pressed part of the detection switch can be surely pressed when the card reader is attached to the host device. Accordingly, in at least an embodiment of the present invention, even in a case that the structure of the host device is simplified, the pressed part of the detection switch can be surely pressed when the card reader is attached to the host device.

Further, in at least an embodiment of the present invention, the pressed part of the detection switch is pressed by the pressing protruded part of the first sealing member and thus on-off switching of the detection switch can be prevented when vibration is occurred in the host device. Therefore, according to at least an embodiment of the present invention, an erroneous detection of the detection switch when vibration is occurred in the host device can be prevented. Further, in at least an embodiment of the present invention, the detection switch is covered by the first sealing member and thus penetration of water to the detection switch can be prevented.

In at least an embodiment of the present invention, it is preferable that the first sealing member is formed with a first pressing protruded part as the pressing protruded part protruding to the host device side attaching face side and a second pressing protruded part as the pressing protruded part protruding to the detection switch side. According to this structure, when the card reader is attached to the host device and the first sealing member is sandwiched between the host device side attaching face and the detection switch, both of the first pressing protruded part and the second pressing protruded part are compressed in the protruding directions. Therefore, a pressing force against the pressed part by the first pressing protruded part and the second pressing protruded part can be increased and, as a result, the pressed part can be surely pressed when the card reader is attached to the host device.

In at least an embodiment of the present invention, it is preferable that the pressed part is formed in a dome shape and an outward form of a tip end part of the second pressing protruded part is smaller than an outward form of the pressed part when viewed in a protruding direction of the pressing protruded part. According to this structure, when the card reader is attached to the host device, the second pressing protruded part can be contacted with the center side of the pressed part formed in a dome shape and, as a result, the pressed part can be pressed further surely.

In at least an embodiment of the present invention, it is preferable that, when viewed in the protruding direction of the pressing protruded part, a center of the first pressing protruded part and a center of the second pressing protruded part are substantially coincided with each other. According to this structure, reaction forces of the first pressing protruded part and the second pressing protruded part which are sandwiched and compressed between the host device side attaching face and the detection switch can be effectively applied to the pressed part. Therefore, the pressing force against the pressed part by the first pressing protruded part and the second pressing protruded part can be increased effectively and, as a result, the pressed part can be pressed further surely when the card reader is attached to the host device.

In at least an embodiment of the present invention, it is preferable that, when viewed in the protruding direction of the pressing protruded part, an outward form of a tip end part of the first pressing protruded part is larger than an outward form of the second pressing protruded part. According to this structure, the host device side attaching face and the first pressing protruded part can be surely contacted with each other and the first pressing protruded part can be surely pressed by the host device side attaching face.

In at least an embodiment of the present invention, it is preferable that the card reader includes an exposed part which is formed with a card insertion port into which a card is to be inserted and is disposed in an opening part formed in a front panel of the host device so as to be exposed to outside of the host device, and a second sealing member which is disposed so as to surround the exposed part for preventing penetration of water through the opening part. In this case, a rear face of the front panel is the host device side attaching face and the first sealing member is integrally formed with the second sealing member. According to this structure, in comparison with a case that the first sealing member is separately formed from the second sealing member, the number of components structuring the card reader can be reduced. Further, in comparison with a case that the first sealing member is separately formed from the second sealing member, the first sealing member can be easily handled when the card reader is assembled.

In at least an embodiment of the present invention, for example, the card reader includes an information processing part structured to perform at least one of reading of information recorded in a card and writing of information to the card and a case body in which the information processing part is accommodated, and the card reader side attaching face is formed in the case body. Further, in at least an embodiment of the present invention, for example, the first sealing member is formed of nitrile rubber.

In at least an embodiment of the present invention, for example, the card reader side attaching face and the host device attaching face are formed in a flat face shape. In this case, the first sealing member and the detection switch can be firmly contacted with each other and thus penetration of water to the detection switch can be prevented surely. In at least an embodiment of the present invention, even when the host device side attaching face is formed in a flat face shape, as described above, the pressed part of the detection switch can be surely pressed by using the pressing protruded part of the first sealing member when the card reader is attached to the host device.

Further, to achieve the above, at least an embodiment of the present invention provides a detection mechanism for detecting detachment of an attached body from an attaching body to which the attached body is attached. The detection mechanism includes a detection switch having a pressed part and being turned to "ON" or "OFF" when the pressed part is pressed and a first sealing member which covers the detection switch for preventing penetration of water to the detection switch. The detection switch is disposed on a first attaching face which is an attaching face of an attached body side for attaching the attached body to the attaching body, the first sealing member is disposed so as to be sandwiched between a second attaching face which is an attaching face of an attaching body side for attaching the attached body to the attaching body and the detection switch, and the first sealing member is formed with a pressing protruded part for pressing the pressed part.

In the detection mechanism in accordance with at least an embodiment of the present invention, the first sealing member disposed so as to be sandwiched between the second attaching face and the detection switch is formed with a pressing protruded part for pressing the pressed part. Therefore, according to at least an embodiment of the present invention, even when the second attaching face is formed in a flat face shape, the pressed part of the detection switch can be surely pressed by using the pressing protruded part of the first sealing member when the attached body is attached to the attaching body. In other words, in at least an embodiment of the present invention, even when a protruded part for pressing the pressed part is not formed in the attaching body, the pressed part of the detection switch can be surely pressed when the attached body is attached to the attaching body. Therefore, according to at least an embodiment of the present invention, even when a structure of the attaching body is simplified, the pressed part of the detection switch can be pressed surely when the attached body is attached to the attaching body.

Further, in at least an embodiment of the present invention, the pressed part of the detection switch is pressed by the pressing protruded part of the first sealing member and thus on-off switching of the detection switch can be prevented when vibration is occurred in the attaching body in a state that the attached body has been attached to the attaching body. Therefore, according to at least an embodiment of the present invention, an erroneous detection of the detection switch can be prevented when vibration is occurred in the attaching body. Further, in at least an embodiment of the present invention, the detection switch is covered by the first sealing member and thus penetration of water to the detection switch can be prevented.

In at least an embodiment of the present invention, for example, the first attaching face and the second attaching face are formed in a flat face shape. In this case, the first sealing member and the detection switch can be firmly contacted with each other and penetration of water to the detection switch can be prevented surely. In at least an embodiment of the present invention, even when the second attaching face is formed in a flat face shape, as described above, the pressed part of the detection switch can be surely pressed by using the pressing protruded part of the first sealing member when the attached body is attached to the attaching body.

As described above, according to at least an embodiment of the present invention, even when the structure of the host device to which the card reader is attached is simplified, the pressed part of the detection switch for detecting detachment of the card reader from the host device can be surely pressed when the card reader is attached to the host device. Further, according to at least an embodiment of the present invention, even when the structure of the attaching body to which the attached body is attached is simplified, the pressed part of the detection switch for detecting detachment of the attached body from the attaching body can be pressed surely when the attached body is attached to the attaching body.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 7(A) is a cross-sectional view showing the "F-F" cross section in FIG. 6 and FIG. 7(B) is a view showing a switch seal part viewed in the "G-G" direction in FIG. 7(A).

FIG. 8(A) is a view showing a state of a sheet switch and a sealing member before the card reader shown in FIG. 1 is attached to a host device, and FIG. 8(B) is a view showing a state of the sheet switch and the sealing member when the card reader shown in FIG. 1 is attached to the host device.

DESCRIPTION OF EMBODIMENTS

An embodiment of the present invention will be described below with reference to the accompanying drawings.
(Entire Structure of Card Reader)

Figure 1:
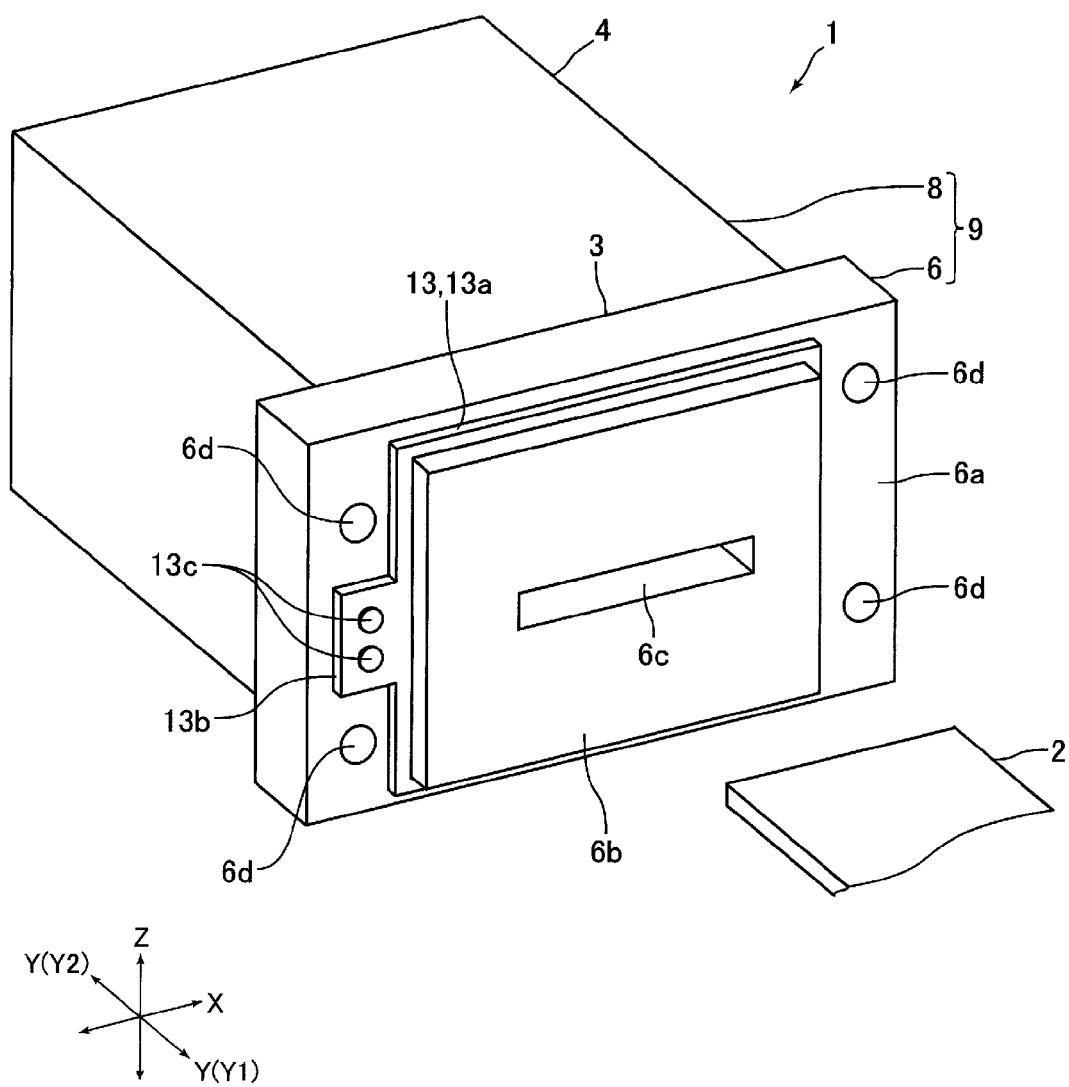
FIG. 1 is a perspective view showing a card reader in accordance with an embodiment of the present invention.
Figure 2:
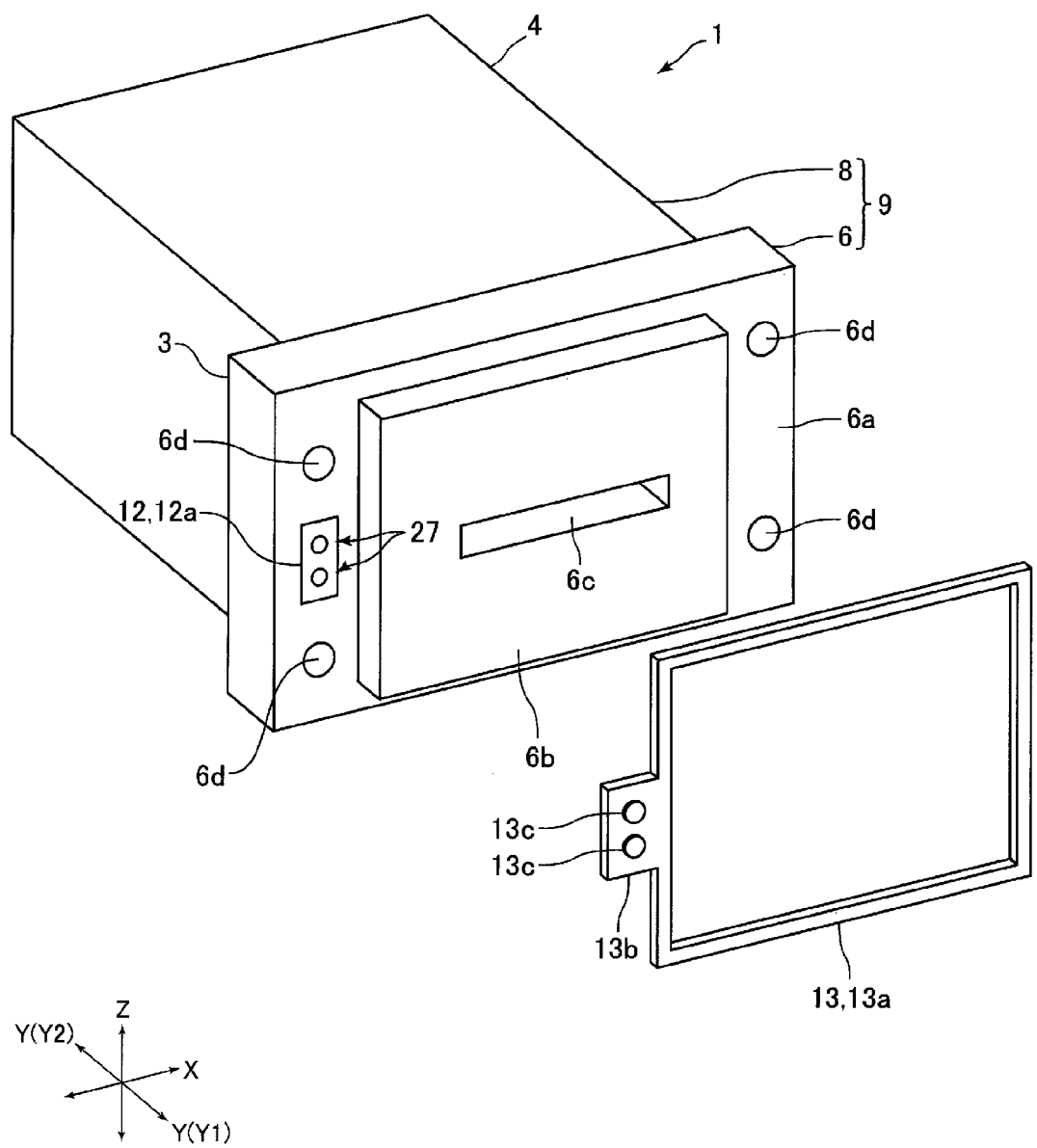
FIG. 2 is an exploded perspective view showing a state that a sealing member is detached from the card reader shown in FIG. 1.
Figure 3:
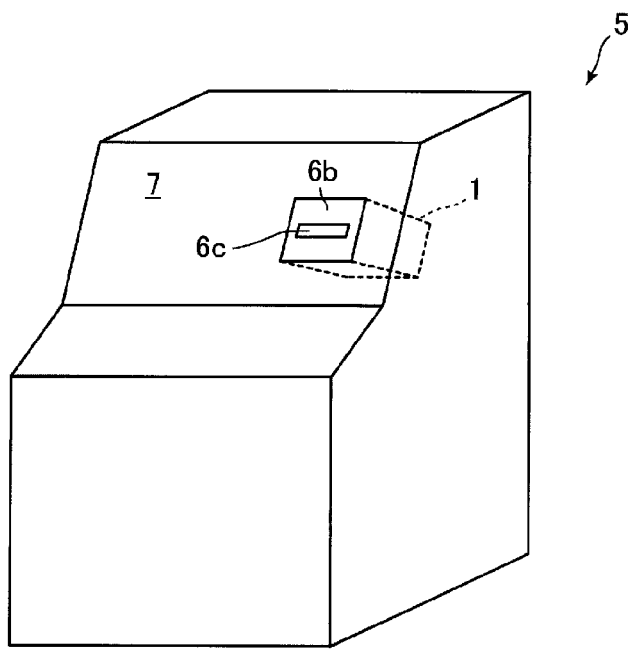
FIG. 3 is a perspective view showing a schematic structure of a host device to which the card reader shown in FIG. 1 is attached.

FIG. 1 is a perspective view showing a card reader 1 in accordance with an embodiment of the present invention. FIG. 2 is an exploded perspective view showing a state that a sealing member 13 is detached from the card reader 1 shown in FIG. 1. FIG. 3 is a perspective view showing a schematic structure of a host device 5 to which the card reader 1 shown in FIG. 1 is attached.

The card reader 1 in this embodiment includes, as shown in FIGS. 1 and 2, a card insertion and ejection part 3 where a card 2 is inserted into and ejected from and a card processing part 4 structured to perform at least one of reading of information recorded in the card 2 and writing of information to the card 2. The card reader 1 is, as shown in FIG. 3, attached to and used in a host device 5 such as an ATM.

A card 2 is, for example, a rectangular card made of vinyl chloride whose thickness is about 0.7-0.8 mm. A surface of the card 2 is, for example, formed with a magnetic stripe in which magnetic information is recorded. Further, for example, an IC chip is incorporated into the card 2. The card 2 may be incorporated with an antenna for communication. Further, a surface of the card 2 may be formed with a print part where printing is performed by a thermal method. Further, the card 2 may be a PET (polyethylene terephthalate) card whose thickness is about 0.18-0.36 mm and may be a paper card having a predetermined thickness.

In the following descriptions, as shown in FIG. 1, three directions perpendicular to each other are set to be an "X" direction, a "Y" direction and a "Z" direction, and the "X" direction is set in a right and left direction, the "Y" direction is set in a front and rear direction and the "Z" direction is set in an upper and lower direction. Further, the "Y1" direction side is a "front" side and the "Y2" direction side is a "rear" side. The "Z" direction is a thickness direction of a card 2 inserted into the card reader 1, the "Y" direction is a longitudinal direction of the card 2 inserted into the card reader 1, and the "X" direction is a lateral direction of the card 2 inserted into the card reader 1.

The card insertion and ejection part 3 includes a front face cover 6 which structures a front face of the card reader 1. A card reader side attaching face 6a in a flat face shape (hereinafter, referred to as an "attaching face 6a") which is an attaching face of the card reader 1 side for attaching the card reader 1 to a host device 5 is formed on a front face side of the front face cover 6. Further, an exposed part 6b which is disposed in an opening part formed in a front panel 7 of the host device 5 is formed on the front face side of the front face cover 6. The exposed part 6b is formed so as to protrude from the attaching face 6a to a front side. The exposed part 6b is, as shown in FIG. 3, exposed to the outside of the host device 5 when the card reader 1 is attached to the host device 5. The exposed part 6b is formed with a card insertion port 6c into which a card 2 is inserted. Insertion holes 6d into which screws (not shown) for fixing the card reader 1 to the front panel 7 are inserted are formed to both the right and left sides of the exposed part 6b.

The card processing part 4 includes an information processing part (not shown) having means for performing writing and reading of information such as a magnetic head, IC contacts and/or a communication antenna, and a main body case 8 which covers the information processing part. The front face cover 6 is fixed to a front end of the main body case 8 and the information processing part is accommodated in a case body 9 which is structured of the front face cover 6 and the main body case 8. The information processing part may include a card conveying mechanism for conveying a card 2 in the information processing part or may include no card conveying mechanism. In other words, the card reader 1 may be a card conveyance type card reader or may be a manual type card reader.

As shown in FIG. 2, the attaching face 6a is disposed with a part of a sheet switch 12 for detecting detachment of the card reader 1 from the host device 5. Further, in this embodiment, a sealing member 13 for preventing penetration of water through a gap space between the opening part of the front panel 7 and the exposed part 6b is disposed so as to surround the exposed part 6*b*. Structures of the sheet switch 12 and the sealing member 13 will be described below.

(Structures of Sheet Switch and Sealing Member)

Figure 4:
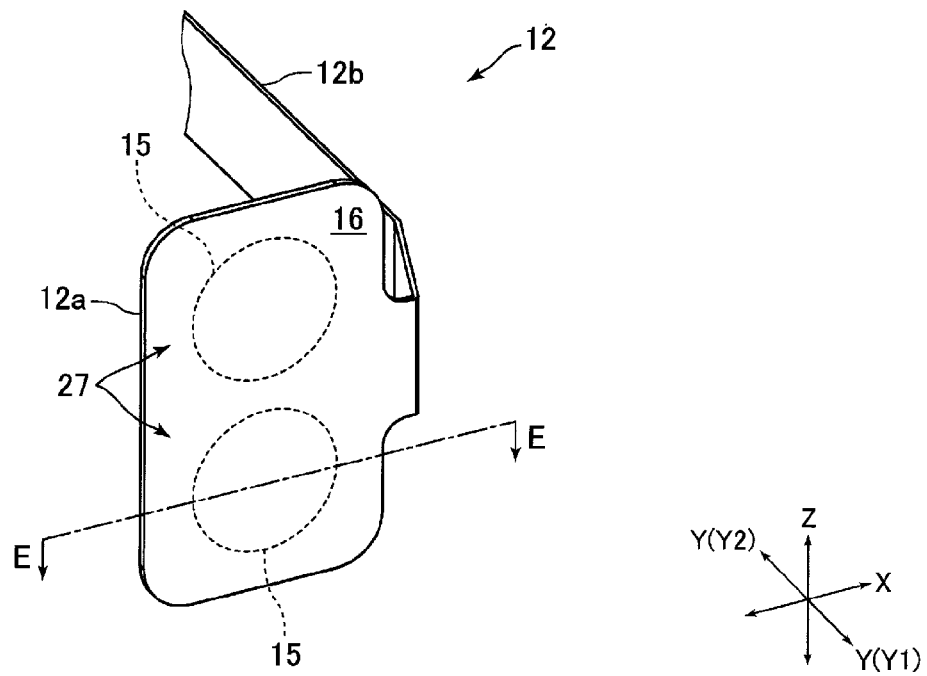
FIG. 4 is a perspective view showing a sheet switch in FIG. 2.
Figure 5:
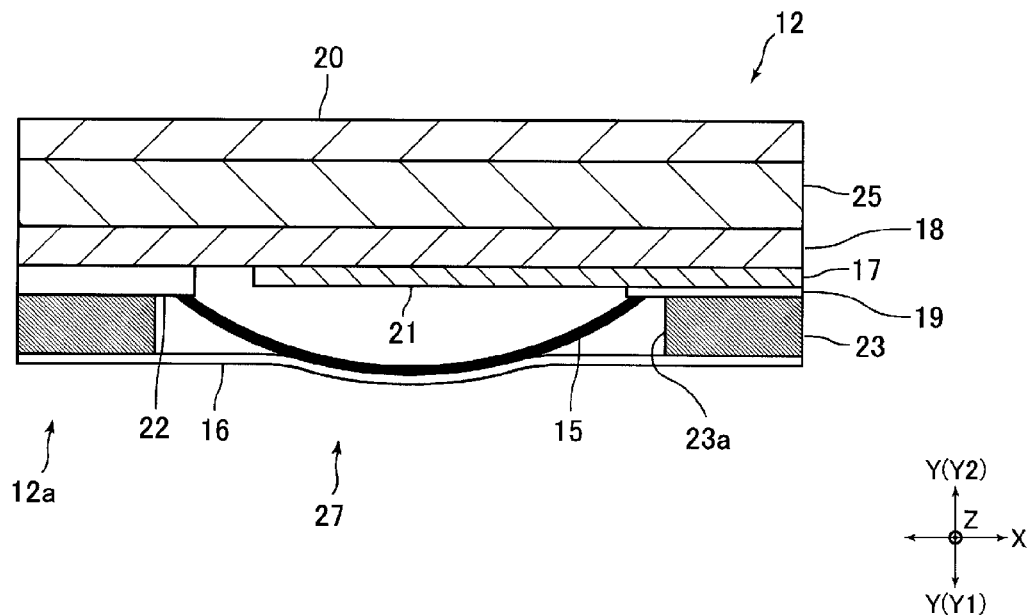
FIG. 5 is a cross-sectional view showing the "E-E" cross section in FIG. 4.
Figure 6:
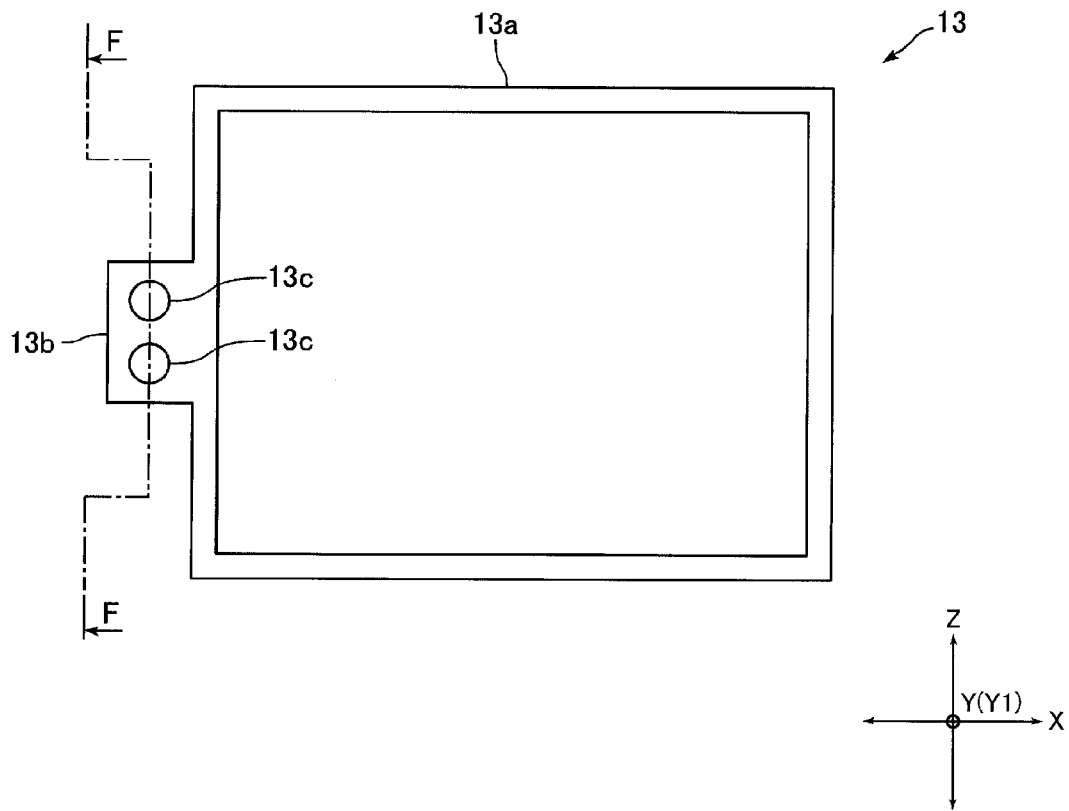
FIG. 6 is a front view showing the sealing member in FIG. 2.

FIG. 4 is a perspective view showing the sheet switch 12 in FIG. 2. FIG. 5 is a cross-sectional view showing the "E-E" cross section in FIG. 4. FIG. 6 is a front view showing the sealing member 13 in FIG. 2. FIG. 7(A) is a cross-sectional view showing the "F-F" cross section in FIG. 6 and FIG. 7(B) is a view showing a switch seal part 13*b* viewed in the "G-G" direction in FIG. 7(A). FIG. 8(A) is a view showing a state of the sheet switch 12 and the switch seal part 13*b* before the card reader 1 shown in FIG. 1 is attached to the host device 5, and FIG. 8(B) is a view showing a state of the sheet switch 12 and the switch seal part 13*b* when the card reader 1 shown in FIG. 1 is attached to the host device 5.

The sheet switch 12 is formed in a thin sheet shape. The sheet switch 12 is structured of a switch part 12*a* as a detection switch which is disposed on the attaching face 6*a* and a connection part 12*b* in a strip shape which is extended from the switch part 12*a*. The connection part 12*b* is extended toward an inside of the card reader 1 and an end part of the connection part 12*b* is connected with a circuit board (not shown) which is disposed in the inside of the card reader 1.

The switch part 12*a* includes, as shown in FIG. 5, a contact electrode 15, a front face sheet 16 which covers a front face of the contact electrode 15, an opposing sheet 18 which is formed with a conductive pattern 17 on its front face, a cover sheet 19 which covers a front face of the conductive pattern 17, and a metal sheet 20 which is disposed on a rear face side of the opposing sheet 18. The front face sheet 16, the opposing sheet 18 and the cover sheet 19 are formed of insulating material in a thin sheet shape. As shown in FIG. 5, an end part of the conductive pattern 17 is not covered by the cover sheet 19 and is exposed. The exposed portion of the conductive pattern 17 is formed as an opposing electrode 21 which is arranged to face the contact electrode 15. Further, the connection part 12*b* includes a conductive pattern which is connected with the conductive pattern 17, an opposing sheet which is integrally formed of the opposing sheet 18, and a cover sheet which is integrally formed of the cover sheet 19.

The contact electrode 15 is formed of metal material having conductivity and elasticity. The contact electrode 15 is formed in a dome shape which is bulged toward a front side and, when pressed from a front side, the contact electrode 15 is recessed toward a rear side. Further, when pressing against the contact electrode 15 from a front side is stopped, the contact electrode 15 is returned to its original dome shape. One portion of a rear end of the contact electrode 15 is contacted with an insulation sheet 22 which is formed of insulating material in a thin sheet shape and another portion of the rear end of the contact electrode 15 is contacted with the cover sheet 19. In this embodiment, the switch part 12*a* is provided with two contact electrodes 15. Two contact electrodes 15 are separately disposed from each other in the upper and lower direction with a predetermined distance therebetween.

The front face sheet 16 is fixed to a front face of a spacer 23 which is formed with an arrangement hole 23*a* in which the contact electrode 15 is disposed. The spacer 23 is formed of resin material and is fixed to front faces of the cover sheet 19 and the insulation sheet 22. As described above, an exposed portion of the conductive pattern 17 formed on the opposing sheet 18 is an opposing electrode 21. In this embodiment, a pair (in other words, two) of opposing electrodes 21 is oppositely disposed to one contact electrode 15 in a separated state from each other. The insulation sheet 22 is disposed between the opposing sheet 18 and the spacer 23. As described above, one portion on the rear end of the contact electrode 15 is contacted with the insulation sheet 22 and another portion on the rear end of the contact electrode 15 is contacted with the cover sheet 19 and thus the contact electrode 15 and the conductive pattern 17 are insulated from each other. The metal sheet 20 is fixed to a rear face of the opposing sheet 18 through an adhesive sheet 25. The adhesive sheet 25 is formed of insulating material such as resin.

In the sheet switch 12, when the contact electrode 15 is pressed from a front side and is recessed toward a rear side and then the contact electrode 15 is contacted with a pair of the opposing electrodes 21, the switch part 12*a* is set in an electrically conductive state. In other words, when the contact electrode 15 is pressed and the contact electrode 15 is contacted with a pair of the opposing electrodes 21, the switch part 12*a* is turned to an "ON" state and, when the contact electrode 15 is not pressed and the contact electrode 15 and a pair of the opposing electrodes 21 are separated from each other, the switch part 12*a* is turned to an "OFF" state. In this embodiment, a pressed part 27 formed in a dome shape is structured of the contact electrode 15, the front face sheet 16, the opposing electrodes 21 and the like and, when the pressed part 27 is pressed, the switch part 12*a* is turned to an "ON" state. As described above, two contact electrodes 15 are disposed in a separated state with a predetermined distance therebetween in the upper and lower direction and two pressed parts 27 are also disposed in a separated state with a predetermined distance therebetween in the upper and lower direction.

The sealing member 13 is formed of rubber. Specifically, the sealing member 13 is formed of nitrile rubber. The sealing member 13 is structured of a seal main body part 13*a* for preventing penetration of water through an opening part of the front panel 7 to an inside of the host device 5 and a switch seal part 13*b* for preventing penetration of water to the switch part 12*a*.

The seal main body part 13*a* is formed in a rectangular frame shape. The seal main body part 13*a* is attached to the exposed part 6*b* so that its inner peripheral end is contacted with an outer peripheral face of the exposed part 6*b* of the front face cover 6. Further, the seal main body part 13*a* is disposed so as to be sandwiched between a rear face 7*a* of the front panel 7 (see FIG. 8(B)) and the attaching face 6*a*. In this embodiment, the rear face 7*a* of the front panel 7 is a host device side attaching face in a flat face shape which is an attaching face on the host device 5 side for attaching the card reader 1 to the host device 5.

The switch seal part 13*b* is formed so as to protrude from one end in the right and left direction of the seal main body part 13*a* to an outer side in the right and left direction. The switch seal part 13*b* is formed in a substantially flat plate shape whose shape when viewed in the front and rear direction is a substantially rectangle and is disposed so that its thickness direction and the front and rear direction are coincided with each other. A size of the switch seal part 13*b* is a size which can cover the entire front face of the switch part 12*a*. A front face of the switch seal part 13*b* is formed with a pressing protruded part 13*c* which is a first pressing protruded part for pressing the pressed part 27. Further, a rear face of the switch seal part 13*b* is formed with a recessed part 13*d* which is recessed to the front side. A pressing protruded part 13e which is a second pressing protruded part for pressing the pressed part 27 is formed in the recessed part 13d.

The pressing protruded part 13c is formed so as to protrude from the front face of the switch seal part 13b to a front side. Further, the pressing protruded part 13c is formed in a flat cylindrical shape. In this embodiment, two pressing protruded parts 13c are formed in the switch seal part 13b. The two pressing protruded parts 13c are disposed in a separated state with a predetermined distance therebetween in the upper and lower direction. The recessed part 13d is, as shown in FIG. 7(B), formed in a substantially rectangular shape when viewed from a rear side. The pressing protruded part 13e is formed so as to protrude from a bottom face (front face) of the recessed part 13d to the rear side. Further, the pressing protruded part 13e is formed in a flat cylindrical shape. In this embodiment, two pressing protruded parts 13e are formed in the switch seal part 13b. In this embodiment, as shown in FIG. 7(A), a rear end face of the pressing protruded part 13e and a rear face of the switch seal part 13b are disposed on the substantially same plane which is perpendicular to the front and rear direction. However, the rear end face of the pressing protruded part 13e may be disposed on the front side relative to the rear face of the switch seal part 13b or may be disposed on the rear side.

A center-distance between the two pressing protruded parts 13c in the upper and lower direction is set to be equal to a center-distance between the two pressing protruded parts 13e in the upper and lower direction. Further, the center-distance between the two pressing protruded parts 13c in the upper and lower direction and the center-distance between the two pressing protruded parts 13e are set to be equal to a center-distance between the two pressed parts 27 in the upper and lower direction (in other words, a center-distance between the contact electrodes 15 in the upper and lower direction). Further, when viewed in the front and rear direction, a center of the pressing protruded part 13c disposed on an upper side, a center of the pressing protruded part 13e disposed on an upper side and a center of the pressed part 27 (in other words, a center of the contact electrode 15) disposed on an upper side are substantially coincided with each other. A center of the pressing protruded part 13c disposed on a lower side, a center of the pressing protruded part 13e disposed on a lower side, and a center of the pressed part 27 (in other words, a center of the contact electrode 15) disposed on a lower side are substantially coincided with each other.

When viewed in the front and rear direction, an outward form of the pressing protruded part 13c is set to be larger than an outward form of the pressed part 27 (in other words, an outward form of the contact electrode 15). In other words, an outer diameter of the pressing protruded part 13c formed in a cylindrical shape is set to be larger than an outer diameter of the pressed part 27 formed in a dome shape (an outer diameter of the contact electrode 15). On the other hand, when viewed in the front and rear direction, an outward form of the pressing protruded part 13e is set to be smaller than the outward form of the pressed part 27 (outward form of the contact electrode 15). In other words, the outer diameter of the pressing protruded part 13e formed in a cylindrical shape is smaller than the outer diameter of the pressed part 27 formed in a dome shape (outer diameter of the contact electrode 15).

The switch seal part 13b is disposed so as to be sandwiched between the rear face 7a of the front panel 7 and the switch part 12a. Further, the switch seal part 13b is disposed so as to cover the front face of the switch part 12a. The switch seal part 13b and the switch part 12a are, as shown in FIG. 8(B), disposed so as to be sandwiched between the rear face 7a of the front panel 7 and the attaching face 6a of the front face cover 6.

When the card reader 1 is attached to the front panel 7 so that the attaching face 6a of the card reader 1 and the rear face 7a of the front panel 7 face each other through a small gap space, as shown in FIG. 8(B), the pressing protruded parts 13c and 13e are compressed between the rear face 7a and the switch part 12a in the front and rear direction to push the pressed part 27. Specifically, the pressing protruded parts 13c and 13e push the pressed part 27 until the contact electrode 15 and the opposing electrode 21 are contacted with each other and the switch part 12a is turned to an electrically conductive state. Therefore, in a state that the card reader 1 has been attached to the front panel 7, the switch part 12a is set in an "ON" state.

On the other hand, when the card reader 1 is detached from the front panel 7, as shown in FIG. 8(A), the pressed part 27 is not pressed and the contact electrode 15 and the opposing electrode 21 are separated from each other by an elastic return force of the contact electrode 15 and thus the switch part 12a is turned to an "OFF" state. When the switch part 12a in an "ON" state is turned to an "OFF" state, it is detected that the card reader 1 has been detached from the host device 5. In a state that the card reader 1 is attached to the front panel 7, as shown in FIG. 8(B), a space is formed between the bottom face of the recessed part 13d and the pressed part 27.

The switch seal part 13b in this embodiment is a first sealing member for preventing penetration of water to the switch part 12a as a detection switch, and the seal main body part 13a is a second sealing member for preventing penetration of water through the opening part of the front panel 7. Further, the card reader 1 in this embodiment is an attached body which is attached to the front panel 7 and the front panel 7 is an attaching body to which the card reader 1 that is an attached body is attached. Further, the attaching face 6a in this embodiment is a first attaching face and the rear face 7a is a second attaching face. In addition, in this embodiment, a detection mechanism for detecting detachment of the card reader 1 from the front panel 7 is structured of the switch part 12a, the switch seal part 13b and the like.

(Principal Effects in this Embodiment)

As described above, in this embodiment, the pressing protruded parts 13c and 13e for pressing the pressed part 27 of the switch part 12a are formed in the switch seal part 13b which is disposed so as to be sandwiched between the rear face 7a of the front panel 7 and the switch part 12a. Therefore, according to this embodiment, even in a case that the rear face 7a of the front panel 7 is formed in a flat face shape, when the card reader 1 is attached to the host device 5, the pressed part 27 can be surely pushed by using the pressing protruded parts 13c and 13e. In other words, in this embodiment, even when an abutting protruded part described in Patent Literature 1 is not formed in the host device 5, the pressed part 27 can be surely pushed when the card reader 1 is attached to the host device 5. Therefore, according to this embodiment, even when the structure of the host device 5 is simplified, the pressed part 27 can be surely pushed when the card reader 1 is attached to the host device 5.

Especially, in this embodiment, the switch seal part 13b is formed with the pressing protruded part 13c protruding to a front side and the pressing protruded part 13e protruding to a rear side. Therefore, when the switch seal part 13b is sandwiched between the rear face 7a of the front panel 7 and the switch part 12*a* by attaching the card reader 1 to the host device 5, the pressing protruded part 13*c* and the pressing protruded part 13*e* are compressed in the front and rear direction. Accordingly, in this embodiment, a pressing force against the pressed part 27 by the pressing protruded parts 13*c* and 13*e* can be increased. As a result, when the card reader 1 is attached to the host device 5, the pressed part 27 can be pushed further surely.

In this embodiment, when viewed in the front and rear direction, the center of the pressing protruded part 13*c* disposed on an upper side, the center of the pressing protruded part 13*e* disposed on an upper side, and the center of the pressed part 27 disposed on an upper side are substantially coincided with each other and, in addition, the center of the pressing protruded part 13*c* disposed on a lower side, the center of the pressing protruded part 13*e* disposed on a lower side, and the center of the pressed part 27 disposed on a lower side are substantially coincided with each other. Therefore, reaction forces of the pressing protruded parts 13*c* and 13*e* sandwiched and compressed between the rear face 7*a* of the front panel 7 and the switch part 12*a* can be effectively applied to the pressed part 27. Further, in this embodiment, when viewed in the front and rear direction, an outward form of the pressing protruded part 13*e* is set to be smaller than an outward form of the pressed part 27 and thus, when the card reader 1 is attached to the host device 5, the pressing protruded part 13*e* can be contacted with a center side of the pressed part 27 which is formed in a dome shape. Therefore, according to this embodiment, a pressing force against the pressed part 27 by the pressing protruded parts 13*c* and 13*e* can be increased effectively. As a result, in this embodiment, when the card reader 1 is attached to the host device 5, the pressed part 27 can be pushed further surely.

In this embodiment, when viewed in the front and rear direction, an outward form of the pressing protruded part 13*c* is set to be larger than an outward form of the pressed part 27. Therefore, according to this embodiment, when the card reader 1 is attached to the host device 5, the rear face 7*a* of the front panel 7 and the pressing protruded part 13*c* can be surely contacted with each other. As a result, the pressing protruded part 13*c* can be surely pushed by the rear face 7*a* of the front panel 7.

In this embodiment, the pressed part 27 is pressed by the pressing protruded parts 13*c* and 13*e* of the sealing member 13 which is formed of rubber. Therefore, according to this embodiment, on-off switching of the switch part 12*a* can be prevented when vibration is occurred in the host device 5 in a state that the card reader 1 is attached. Accordingly, in this embodiment, an erroneous detection of the switch part 12*a* when vibration is occurred in the host device 5 can be prevented. Further, in this embodiment, the switch part 12*a* is covered by the switch seal part 13*b* and thus penetration of water to the switch part 12*a* can be prevented. Especially, in this embodiment, the rear face 7*a* of the front panel 7 and the attaching face 6*a* of the front face cover 6 are formed in a flat face shape. Therefore, penetration of water to the switch part 12*a* can be surely prevented by strongly contacting the switch seal part 13*b* with the switch part 12*a* which are sandwiched between the rear face 7*a* and the attaching face 6*a*.

In this embodiment, the seal main body part 13*a* for preventing penetration of water through the opening part of the front panel 7 to an inside of the host device 5 and the switch seal part 13*b* for preventing penetration of water to the switch part 12*a* are integrally formed with each other. Therefore, according to this embodiment, in comparison with a case that the seal main body part 13*a* and the switch seal part 13*b* are formed separately from each other, the number of components structuring the card reader 1 can be reduced. Further, in this embodiment, in comparison with a case that the seal main body part 13*a* and the switch seal part 13*b* are formed separately from each other, handling of the switch seal part 13*b* can be performed easily at the time of assembling of the card reader 1.

Other Embodiments

Although at least an embodiment of the present invention has been shown and described with reference to a specific embodiment, various changes and modifications will be apparent to those skilled in the art from the teachings herein.

In the embodiment described above, when viewed in the front and rear direction, an outward form of the pressing protruded part 13*c* is larger than an outward form of the pressed part 27. However, when viewed in the front and rear direction, an outward form of the pressing protruded part 13*c* may be the same size as an outward form of the pressed part 27 or smaller than an outward form of the pressed part 27. Further, in the embodiment described above, when viewed in the front and rear direction, an outward form of the pressing protruded part 13*e* is smaller than an outward form of the pressed part 27. However, when viewed in the front and rear direction, an outward form of the pressing protruded part 13*e* may be the same size as an outward form of the pressed part 27 or larger than an outward form of the pressed part 27.

In the embodiment described above, when viewed in the front and rear direction, the center of the pressing protruded part 13*c* disposed on an upper side and the center of the pressing protruded part 13*e* disposed on an upper side are substantially coincided with each other, and the center of the pressing protruded part 13*c* disposed on a lower side and the center of the pressing protruded part 13*e* disposed on a lower side are substantially coincided with each other. However, the present invention is not limited to this embodiment. For example, when viewed in the front and rear direction, the center of the pressing protruded part 13*c* disposed on an upper side and the center of the pressing protruded part 13*e* disposed on an upper side may be displaced from each other, and the center of the pressing protruded part 13*c* disposed on a lower side and the center of the pressing protruded part 13*e* disposed on a lower side may be displaced from each other.

In the embodiment described above, the pressing protruded parts 13*c* and 13*e* are formed in a flat cylindrical shape. However, the present invention is not limited to this embodiment. For example, the pressing protruded parts 13*c* and 13*e* may be formed in a flat polygonal prism shape such as a flat quadrangular prism shape or a flat hexagonal prism shape, or may be formed in a flat elliptic cylinder shape. Further, the pressing protruded parts 13*c* and 13*e* may be formed in a flat circular truncated cone shape, or may be formed in a flat polygonal frustum shape. In this case, for example, when viewed in the front and rear direction, an outward form of a tip end part of the pressing protruded part 13*c* is formed larger than an outward form of the pressed part 27, and an outward form of a tip end part of the pressing protruded part 13*e* is formed smaller than an outward form of the pressed part 27.

In the embodiment described above, the switch seal part 13*b* is formed with the pressing protruded part 13*c* protruding to a front side and the pressing protruded part 13*e* protruding to a rear side. However, the present invention is not limited to this embodiment. For example, the switch seal part 13*b* may be formed with only one of the pressing protruded part 13*c* and the pressing protruded part 13*e*.

In the embodiment described above, the seal main body part 13*a* and the switch seal part 13*b* are integrally formed with each other. However, the present invention is not limited to this embodiment. For example, the seal main body part 13*a* and the switch seal part 13*b* may be separately formed from each other. Further, in the embodiment described above, the sealing member 13 is structured of the seal main body part 13*a* and the switch seal part 13*b*. However, the sealing member 13 may be structured of only the switch seal part 13*b*.

In the embodiment described above, two pressed parts 27 are formed in the switch part 12*a*. However, the present invention is not limited to this embodiment. For example, one pressed part 27 may be formed in the switch part 12*a* or three or more pressed parts 27 may be formed in the switch part 12*a*. Further, in the embodiment described above, the switch part 12*a* structuring a part of the sheet switch 12 is formed with the pressed part 27 in a dome shape. However, the pressed part 27 may be formed in a detection switch other than the sheet switch part 12. Further, in the embodiment described above, the switch part 12*a* is turned to an "ON" state when the pressed part 27 is pressed and, when the pressed part 27 is not pressed, the switch part 12*a* is set in an "OFF" state. However, the switch part 12*a* may be structured so that the switch part 12*a* is turned to an "OFF" state when the pressed part 27 is pressed and, when the pressed part 27 is not pressed, the switch part 12*a* is set in an "ON" state.

In the embodiment described above, the detection mechanism for detecting detachment of the card reader 1 from the front panel 7 is structured of the switch part 12*a* and the switch seal part 13*b*. However, the present invention is not limited to this embodiment. For example, a detection mechanism for detecting detachment of a device other than the card reader 1 from a host device to which the device is attached may be structured of the switch part 12*a*, the switch seal part 13*b* and the like. In this case, a device other than the card reader 1 is an attached body and a host device is an attaching body.

For example, a detection mechanism for detecting detachment of the front face cover 6 from the main body case 8 may be structured of the switch part 12*a*, the switch seal part 13*b* and the like. In this case, the front face cover 6 is an attached body and the main body case 8 is an attaching body. Further, in this case, even when a protruded part for pressing the pressed part 27 is not formed in the front face cover 6, the pressed part 27 can be surely pushed when the front face cover 6 is attached to the main body case 8.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. A card reader which is attached and used in a host device, when an attaching face of the card reader for attaching the card reader to the host device is referred to as a card reader side attaching face, and an attaching face of the host device for attaching the card reader to the host device is referred to as a host device side attaching face, the card reader comprising:
   a detection switch disposed on the card reader side attaching face and structured to detect whether the card reader has been detached from the host device; and
   a first sealing member disposed so as to be sandwiched between the host device side attaching face and the detection switch the first sealing member covering the detection switch and being structured to prevent penetration of water to the detection switch;
   wherein the detection switch comprises a pressed part and is structured to turn to "ON" or "OFF" when the pressed part is pressed; and
   wherein the first sealing member is formed with a pressing protruded part structured to press the pressed part.

2. The card reader according to claim 1, wherein the first sealing member is formed with a first pressing protruded part as the pressing protruded part protruding to a host device side attaching face side and a second pressing protruded part as the pressing protruded part protruding to a detection switch side.

3. The card reader according to claim 2, wherein the pressed part is formed in a dome shape, and
   an outward form of a tip end part of the second pressing protruded part is smaller than an outward form of the pressed part when viewed in a protruding direction of the pressing protruded part.

4. The card reader according to claim 3, wherein when viewed in the protruding direction of the pressing protruded part, a center of the first pressing protruded part and a center of the second pressing protruded part are substantially coincided with each other.

5. The card reader according to claim 4, wherein when viewed in the protruding direction of the pressing protruded part, an outward form of a tip end part of the first pressing protruded part is larger than an outward form of the second pressing protruded part.

6. The card reader according to claim 1, further comprising:
   an exposed part which is formed with a card insertion port into which a card is to be inserted and is disposed in an opening part formed in a front panel of the host device so as to be exposed to outside of the host device; and
   a second sealing member disposed so as to surround the exposed part and structured to prevent penetration of water through the opening part;
   wherein a rear face of the front panel is the host device side attaching face, and
   wherein the first sealing member is integrally formed with the second sealing member.

7. The card reader according to claim 6, further comprising:
   an information processing part structured to perform at least one of reading of information recorded in a card and writing of information to the card; and
   a case body in which the information processing part is accommodated;
   wherein the card reader side attaching face is formed in the case body.

8. The card reader according to claim 6, wherein the first sealing member comprises nitrile rubber.

9. The card reader according to claim 6, wherein the card reader side attaching face and the host device attaching face are formed in a flat face shape.

10. The card reader according to claim 6, wherein the first sealing member is formed with a first pressing protruded part as the pressing protruded part protruding to a host device side attaching face side and a second pressing protruded part as the pressing protruded part protruding to a detection switch side.

11. The card reader according to claim 10, wherein
the pressed part is formed in a dome shape, and
an outward form of a tip end part of the second pressing protruded part is smaller than an outward form of the pressed part when viewed in a protruding direction of the pressing protruded part.

12. The card reader according to claim 11, wherein
the first sealing member and the second sealing member are formed of rubber,
a recessed part which is recessed toward the host device side attaching face side is formed on a card reader side attaching face side of the first sealing member,
the second pressing protruded part is formed in the recessed part,
when the card reader is attached to the rear face of the front panel, the first pressing protruded part and the second pressing protruded part are compressed between the rear face and the detection switch to press the pressed part.

13. The card reader according to claim 10, wherein when viewed in a protruding direction of the pressing protruded part, a center of the first pressing protruded part and a center of the second pressing protruded part are substantially coincided with each other.

14. The card reader according to claim 10, wherein when viewed in a protruding direction of the pressing protruded part, an outward form of a tip end part of the first pressing protruded part is larger than an outward form of the second pressing protruded part.

15. A detection mechanism for detecting detachment of an attached body from an attaching body to which the attached body is attached, the detection mechanism comprising:
a detection switch comprising a pressed part and is structured to turn to "ON" or "OFF" when the pressed part is pressed; and
a first sealing member covering the detection switch and structured to prevent penetration of water to the detection switch;
wherein the detection switch is disposed on a first attaching face which is an attaching face of an attached body side for attaching the attached body to the attaching body;
wherein the first sealing member is disposed so as to be sandwiched between a second attaching face, which is an attaching face of an attaching body side for attaching the attached body to the attaching body, and the detection switch; and
wherein the first sealing member is formed with a pressing protruded part for pressing the pressed part.

16. The detection mechanism according to claim 15, wherein the first attaching face and the second attaching face are formed in a flat face shape.

17. The detection mechanism according to claim 15, wherein
the attached body comprises:
an exposed part which is disposed in an opening part formed in the attaching body and is exposed to outside of the attaching body; and
a second sealing member which is disposed so as to surround the exposed part and structured to prevent penetration of water through the opening part,
the first attaching face is formed so as to surround the exposed part, and
the first sealing member is integrally formed with the second sealing member.

18. The detection mechanism according to claim 17, wherein the first sealing member is formed with a first pressing protruded part as the pressing protruded part protruding to a second attaching face side and a second pressing protruded part as the pressing protruded part protruding to a detection switch side.

19. The detection mechanism according to claim 18, wherein
the first sealing member and the second sealing member are formed of rubber,
a recessed part which is recessed toward the second attaching face side is formed on a first attaching face side of the first sealing member,
the second pressing protruded part is formed in the recessed part,
when the attached body is attached to the attaching body, the first pressing protruded part and the second pressing protruded part are compressed between the second attaching face and the detection switch to press the pressed part.

20. The detection mechanism according to claim 18, wherein
the pressed part is formed in a dome shape, and
an outward form of a tip end part of the second pressing protruded part is smaller than an outward form of the pressed part when viewed in a protruding direction of the pressing protruded part.

21. The detection mechanism according to claim 18, wherein when viewed in a protruding direction of the pressing protruded part, a center of the first pressing protruded part and a center of the second pressing protruded part are substantially coincided with each other.

22. The detection mechanism according to claim 18, wherein when viewed in a protruding direction of the pressing protruded part, an outward form of a tip end part of the first pressing protruded part is larger than an outward form of the second pressing protruded part.

* * * * *